Nov. 15, 1927.
C. A. WARD
1,649,630
DELIVERY TRUCK
Filed March 25, 1926
3 Sheets-Sheet 2
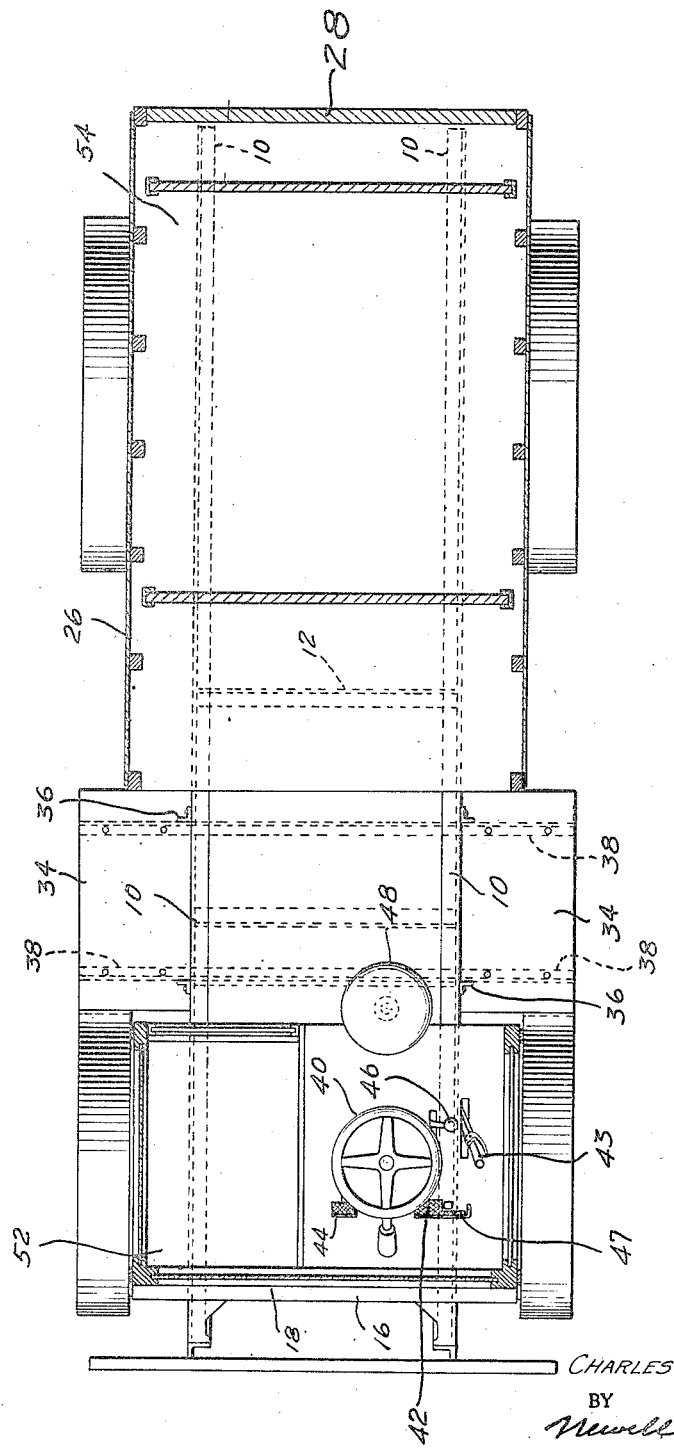
INVENTOR
CHARLES A. WARD
BY
ATTORNEY

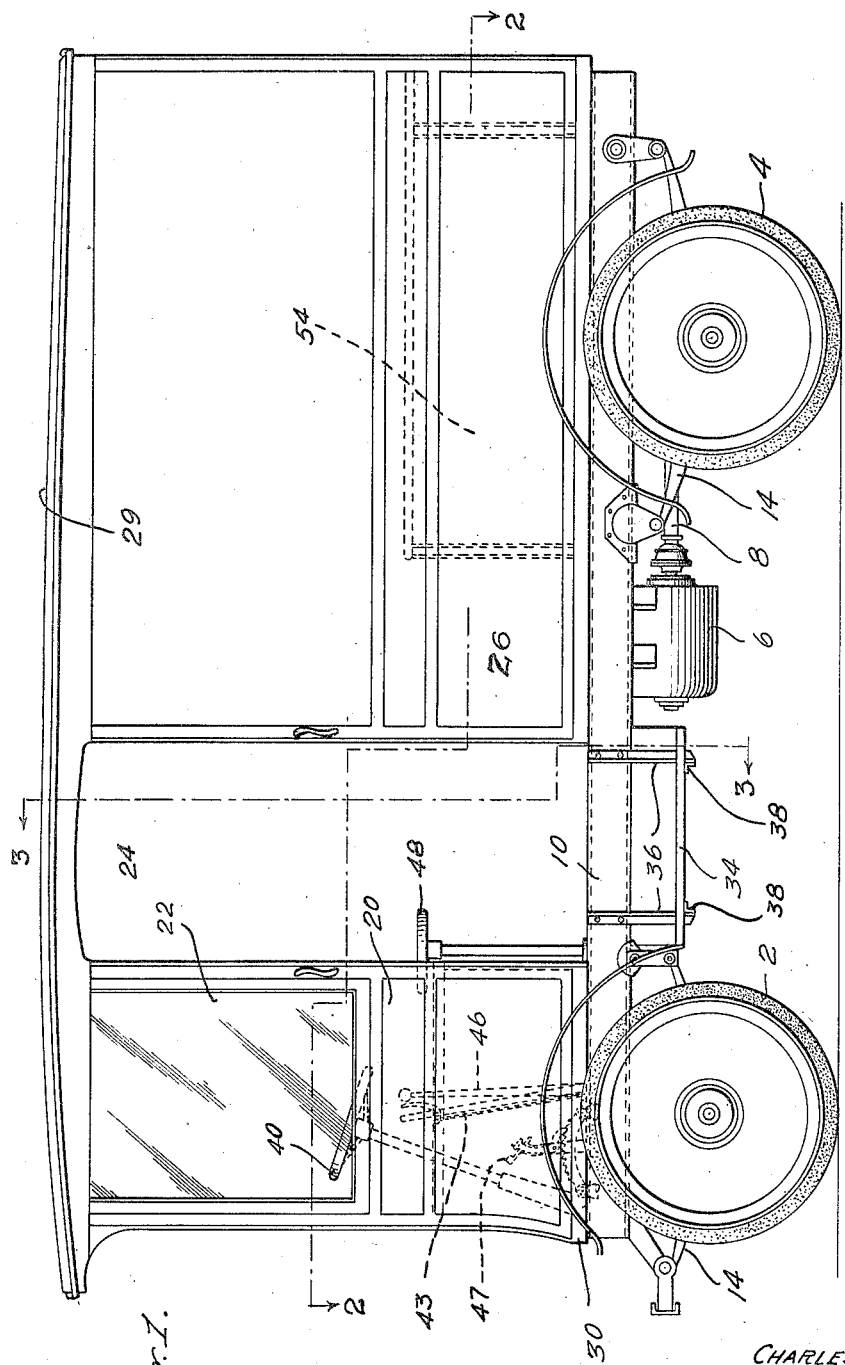

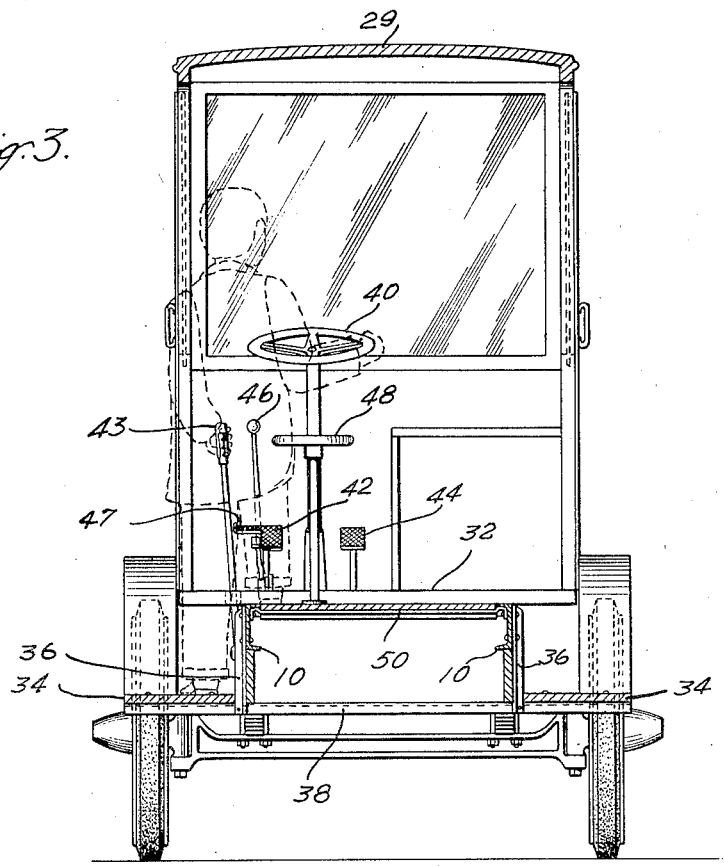

Patented Nov. 15, 1927.

1,649,630

UNITED STATES PATENT OFFICE.

CHARLES A. WARD, OF MOUNT VERNON, NEW YORK.

DELIVERY TRUCK.

Application filed March 25, 1926. Serial No. 97,174.

This invention relates to delivery trucks.

In making deliveries of milk and other products where a large number of deliveries are made in a restricted area to customers located relatively close together, it is highly desirable that the operator should be able to start and stop the truck quickly and easily in going from one customer to the next. In making deliveries of this kind, a drop body construction has been extensively employed in which the floor of the body of the truck at the longitudinal central part thereof is offset below the floor at the forward and rear portions of the body and the side door openings are located in registry with the drop or recess thus formed in the bottom of the body. This enables the operator to step into and dismount from the body easily and the vehicle controlling devices may be reached while the operator is standing in the central part of the body.

This construction, however, has certain marked disadvantages. The drop body construction requires a special chassis in which the main side members of the frame extend from each end of the vehicle only to the dropped portion of the body and are connected by a series of frame members constructed to accommodate the dropped body portion. This special construction is much more expensive to build than a construction embodying the standard form of chassis and is generally speaking, not as strong as a standard chasis, so that certain of the frame parts are liable to give way under the strains to which a vehicle of this character is subjected in ordinary use.

One object of the present invention is to improve the construction of delivery trucks and to produce a truck construction which is well adapted for making deliveries of the character above described and in which a standard form of chassis is employed.

Another object of the invention is to produce a truck construction having longitudinal side frame members extending substantially in an unbroken line throughout the length of the truck, side door openings and side steps for use in entering the same, in which the truck may be readily controlled by the operator while standing on one of the side steps.

With these and other objects in view the invention comprises novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings

Fig. 1 is a view in side elevation of a truck embodying the invention;

Fig. 2 is a view in horizontal section of the truck taken substantially on the line 2—2 of Figure 1; and Fig. 3 is a view in vertical section of the truck taken substantially on the line 3—3 of Figure 1.

The truck embodying the invention as illustrated in the drawings of this application comprises a chassis of the usual or standard construction mounted upon forward and rear wheels 2 and 4. As shown, the invention is embodied in a truck of the electric type and comprises a driving motor 6 connected by suitable shafting 8 with the rear wheels 4.

As stated above, the chassis is of standard construction and comprises the usual side frame members 10 extending the whole length of the truck, connected by suitable cross frame members 12 and supported upon the front and rear axles of the truck by means of spring 14.

The body is mounted upon the longitudinal side frame members 10. The body comprises a front panel 16 having in its upper portion a windshield 18, preferably of glass and forward side panels 20, each having a window 22 in the upper portion thereof. At the rear of each side panel is a door way or opening 24 through which the operator may enter and leave the truck. At the rear of each opening 24 the body is provided with a side panel 26 and a panel 28 extending across the rear of the body between the panels 26. This rear end panel may be omitted or rear doors may be substituted, if desired. The front, side and rear panels are connected at their upper portions by a cover member or panel 29 which forms a roof for the body. The body of the truck is provided with side sills 30 extending along the bases of the side panels and with flooring 32.

As will be noted from an inspection of Figures 2 and 3, the body of the vehicle overhangs the longitudinal side frame members 10 for a considerable distance upon each side of the truck in order to give as large an amount of space as possible in the inside of the body for the placing of materials to be delivered. Upon each side of the truck is mounted a step 34 to enable the operator readily to enter and dismount from the truck. As clearly shown in Figures 2 and 3, each step extends inwardly to a point substantially directly below the outer part of each longitudinal side member 10 and the steps are suspended from the side members 10 by means of vertical angle bars 36 secured to the side members 10 and horizontal angle bars 38 secured to the lower ends of the angle bars 36.

In the present embodiment of the invention, the devices for controlling the movement of the truck, are located within the space enclosed by the front panel 16 and the side panels 20 and are arranged adjacent the left-hand side of the body. As stated above, the truck as shown is provided with an electrical driving mechanism. The devices for controlling the movement of the truck, comprise a steering wheel 40, an outer foot brake pedal 42, an inner foot brake pedal 44 and a lever 46 for controlling the current through the driving motor 6. The truck also may be provided with an interconnected brake hand lever 43, as shown in the drawings of this application. The brake pedal 42 is preferably provided with an extension pad 47 to enable the operator readily to engage and operate this pedal with his right foot, while standing on the step. The seat for the driver indicated at 48 is shown as located at the rear of the steering wheel. This seat may or may not be removable, as desired.

It is highly desirable, as stated above, that the operator should be able to start and stop the vehicle quickly and easily in making deliveries between closely adjacent points. To this end, in the present construction the parts are constructed and arranged so that the operator may conveniently reach the devices for controlling the vehicle within the forward portion thereof, while standing on the adjacent side step. As above described, the steps 34 extend inwardly to a point substantially below the outer portions of the longitudinal side members 10 of the chassis. This places the inner portion of each step below the portion of the body which overhangs the longitudinal side members 10. In order that the operator, while standing with the left foot on the left-hand step of the truck may readily reach and operate the devices for controlling the vehicle, the side sill 30 and the floor 32 of the body are cut away at the door openings 24 and above the left-hand step. This enables the operator to stand with his left foot upon the inner part of the left-hand step and with his body substantially within the body of the truck, as shown on dotted lines, Fig. 3, and in this position, he can readily manipulate the steering wheel and can easily reach the brake hand lever 43 with his left hand, and operate the control lever 46 with his left hand after releasing the brake by means of the lever 43. While standing in this position, the operator also can easily operate the brake pedal 42 with his right foot and can operate the control lever 46 with his right leg. This is highly advantageous where the brake hand lever 43 is omitted from the control mechanism. Thus the operator, after making a delivery at one place, may step on the left-hand step, grasp the steering wheel and reach the control mechanisms within the forward part of the truck and manipulate the same easily and conveniently to start and stop the truck. Thus, with the present construction, the truck may be driven from one point to another in making a series of deliveries, with much less labor and effort on the part of the operator and with a considable saving of time as compared with the usual construction, having a uniform floor level, in which it is impractical to operate the car from one of the side steps. Furthermore, the disadvantages of the drop body construction above pointed out, are avoided in the present body construction.

The sill 30 and floor 32 of the body are also cut away above the right-hand step at the corresponding door opening. The recesses formed on each side of the body at the door openings by cutting away the body also enables the operator to stand on either step with the upper portion of his body substantially within the body of the truck so that he may conveniently reach certain of the goods placed within the body without entering the same.

The central part of the truck body between the door openings 24 is provided with a flooring 50 extending between the longitudinal side frame members 10. The truck is preferably provided with a battery compartment 52 located within the forward portion of the body of the truck and with battery compartment 54 located within the rear portion of the body of the truck. The goods to be delivered may be located in front of battery compartment 54 and also may occupy the whole space above the battery compartment. Goods may be placed also in the forward portion of the vehicle above the battery compartment 52, if desired.

In the present truck construction a standard chassis is employed having longitudinal side frame members extending the full length of the truck so that the chassis is strong and sturdy and will stand up well under the strains to which said trucks are ordinarily subjected. Furthermore, the chassis and body construction may be produced much more cheaply than any construction requiring the use of a special chassis. The truck provides a relatively large storage space for products to be delivered and may be started and stopped quickly and easily in making deliveries to successive customers located relatively close together.

It is to be understood that the invention is not limited to the particular construction and arrangement of parts of the illustrated embodiment thereof, but that the invention may be embodied in other forms within the scope of the claims.

Having explained the nature and object of the invention and having specifically described a construction embodying the invention in its preferred form, what is claimed is—

1. A truck comprising a chassis having longitudinal side frame members extending substantially in an unbroken line throughout the length of the truck from the front to the rear thereof, a body overhanging the chassis at the sides thereof and having one or more side openings between the forward and rear portions of the body for the entrance and exit of the operator, a step extending beneath the overhanging part of the body below one of said openings, a driving motor, devices for controlling the movement of the truck located within the forward portion of the body, the overhanging portion of the body being cut away above the step to enable the operator to reach readily said controlling devices while standing on said step.

2. A delivery truck comprising a chassis having longitudinal side frame members extending substantially in an unbroken line throughout the length of the truck from the front to the rear thereof, a body overhanging the chassis at the sides thereof and having side sills and flooring and provided with one or more side openings between the forward and rear portions of the body for the entrance and exit of the operator, a step extending beneath the overhanging part of the body below one of said openings, a motor, devices for controlling the movement of the truck, the side sill and flooring above the step being cut away to enable the operator readily to gain access to said controlling devices while standing on the step.

3. A delivery truck comprising a chassis having longitudinal side frame members extending substantially in an unbroken line throughout the length of the truck from the front to the rear thereof, a body overhanging the chassis at the sides thereof and having front and side panels at the forward portion of the body, rear and side panels at the rear portion of the body and one or more side openings for the entrance and exit of the operator, a step extending beneath the overhanging part of the body below one of said openings, a motor, devices for controlling the movement of the truck located at the forward part of the body within the space enclosed by said front and side panels, the overhanging portion of the body being cut away above the step to enable the operator readily to reach said controlling devices while standing on the step.

4. A delivery truck comprising a chassis having longitudinal side frame members extending substantially in an unbroken line throughout the length of the truck from the front to the rear thereof, a body overhanging said side frame members at the sides of the body and having side openings between the forward and rear portions of the body for the entrance and exit of the operator, a motor, devices for controlling the movement of the truck enclosed within the forward portion of the body and located adjacent one side thereof, a step suspended from a side frame member on the said side of the body and extending beneath the overhanging part of the body, the body being cut away above said step to enable the operator readily to gain access to said controlling devices while standing on the step.

5. A delivery truck comprising a chassis having longitudinal side frame members extending substantially in an unbroken line throughout the length of the truck from the front to the rear thereof, a body overhanging the chassis at the sides thereof and provided with side openings between the forward and rear portions of the body for the entrance and exit of the operator, a motor, devices for controlling the movement of the truck enclosed within the forward portion of the body and located adjacent one side thereof, a step extending beneath the overhanging part of the body below the opening at the latter side of the body, the body being cut away above said step to enable the operator readily to gain access to the controlling devices while standing on the step.

6. A delivery truck comprising a chassis having two parallel continuous longitudinal side frame members extending in a generally horizontal direction throughout the length of the truck from the front to the rear thereof, a body overhanging the chassis at the sides thereof and having one or more side openings between the forward and rear portions of the body for the entrance and exit of the operator, a step extending beneath the overhanging part of the body below one of said openings, a driving motor, devices for controlling the movement of the truck located within the forward portion of the body, the overhanging portion of the body being cut away above the step to enable the operator to reach readily said controlling devices while standing on the step.

Signed at Washington, D. C., this 22nd day of March, 1926.

CHARLES A. WARD.